United States Patent
Loqvist

[15] 3,677,060
[45] July 18, 1972

[54] COMPOSITE TOOL
[72] Inventor: Kaj-Ragnar Loqvist, Fagersta, Sweden
[73] Assignee: Fagersta Bruks Aktiebolag, Fagersta, Sweden
[22] Filed: June 24, 1970
[21] Appl. No.: 49,314

[30] Foreign Application Priority Data
June 27, 1969 Sweden..............................9220/69

[52] U.S. Cl. ..............................72/476, 29/473.1, 76/107 A
[51] Int. Cl. ........................................................B21d 37/00
[58] Field of Search....................72/476, 479, 480, 478, 273, 72/267, 283, 209; 76/101 A, 101 R, 102 A; 29/473.1, 474.4, 479, 489

[56] References Cited

UNITED STATES PATENTS

| | | | |
|---|---|---|---|
| 3,372,464 | 3/1968 | Vincent et al. | 29/474.4 |
| 1,698,034 | 1/1929 | Stringfellow | 29/479 |
| 2,019,934 | 11/1935 | Schroter et al. | 76/101 A |
| 2,124,438 | 7/1938 | Struk et al. | 76/101 A |
| 2,418,338 | 4/1947 | Dworkowski et al. | 76/101 A |
| 2,474,643 | 6/1949 | Webb | 76/101 A |
| 3,180,023 | 4/1965 | Titus | 29/473.1 |

OTHER PUBLICATIONS

Techniques of Presswrking Sheetmetal, Eary, D. F. and Reed, E. A., 1958, Die Desgin Techniques, p. 354, FIG. 263

*Primary Examiner*—Richard J. Herbst
*Attorney*—Bauer and Goodman

[57] ABSTRACT

A composite working tool having a working surface and a desired direction of metal working and power transmitting movement comprising a composite composed of two bodies, each of a different metal; one of said metals being harder than the other and being the working surface. The two of said bodies are in direct contact with each other along a plane substantially perpendicular to said direction of movement whereby power is transmitted from one of said bodies to the other across said plane when said composite working tool is moved. One of said bodies has a narrowed portion and the other of said bodies has an opening defined therewithin to receive said narrowed portion. Each of said narrowed portion and said opening have defining walls in the desired direction of movement of the tool. The defined opening is larger in size than the narrowed portion to receive the same therein with clearance between said defining walls. Brazing filler metal is positioned in said clearance between said defining walls to bond the same together in the desired direction of movement of said tool. The working surface of said composite tool is preferably a hard metal carbide and the other metal of said tool is preferably a steel shank. The composite tool is preferably manufactured utilizing cooling of the steel shank when the hard solder is heated.

12 Claims, 2 Drawing Figures

PATENTED JUL 18 1972

3,677,060

INVENTOR.
KAJ-RAGNAR
LOQVIST
BY
Bauer & Goodman
ATTORNEYS

COMPOSITE TOOL

BACKGROUND OF THE INVENTION

Hardened steel tools such as plungers for deep drawing, punching, etc., which are faced with hard metal carbides on the working surface are difficult to manufacture and when manufactured have limited durability. This is in part caused by the difference in linear expansion of the steel tool body and that of the hard metal carbide working face which results in differential contracting during the manufacture of the tool and a consequent reduction in durability, especially resistance to fatigue, in and adjacent to the joint between the shank and the working face caused by stresses in said joint. The present invention provides improved composite tools having a hard metal carbide working face.

SUMMARY OF THE INVENTION

A composite working tool having a working surface and an axial direction of metal working movement and of power transmission, said composite tool comprising a power transmitting body and a working body having said working surface, said working body being composed of hard metal carbide and being harder than said power transmitting body, said power transmitting body and said working body being in direct contact with each other along a plane substantially perpendicular to said axial direction whereby power is transmitted from one of said bodies to the other across said plane, one of said bodies having a narrowed portion and the other of said bodies having an opening defined therewithin to receive said narrowed portion, each of said narrowed portion and said opening having defining walls in the said axial direction, said defined opening being larger in size than said narrowed portion to receive the same therein with clearance between said defining walls, and brazing filler metal in said clearance and positioned between said defining walls to bond the same together in the said direction of power transmission of said tool. The composite tool has a hard metal carbide working surface bonded to a steel shank. The defining wall of the opening in the steel shank forms a collar which surrounds the male portion of the hard metal carbide.

The invention also provides a method for producing the foregoing composite tool in which the shank is cooled while the brazing filler metal is heated to form the bonded joint. When applied to the composite tool of FIG. 1, the process comprises applying brazing filler metal in said clearance between the collar of the steel shank and said male portion of the hard metal carbide, and heating said brazing filler metal to substantially its melting point while cooling said steel shank.

DESCRIPTION OF THE PREFERRED EMBODIMENTS

Figure 1:
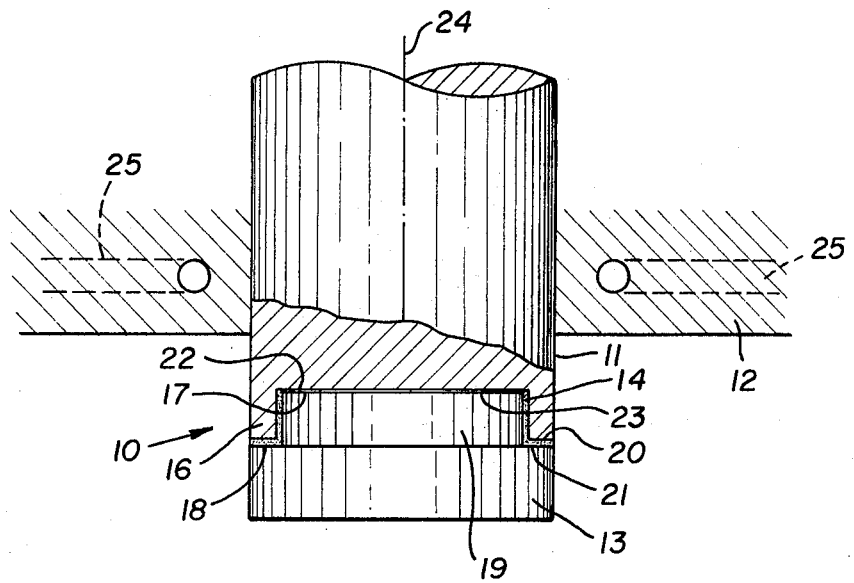
FIG. 1 is a partial sectional elevation of one embodiment of the invention.

Reference is first made to FIG. 1 depicting a cross-section of a composite tool 10 of the present invention together with apparatus utilized in manufacturing said composite tool 10. The intended working direction of tool 10 is substantially axial along axis 24. The composite tool 10 has a steel shank 11 with a downwardly extending rim or collar 16 positioned around neck 19 which extends upwardly from the hard metal carbide facing 13. Neck 19 is joined to collar 16 along longitudinal joint 14 by brazing filler metal. The brazing filler metal preferably also extends along the joint 18 formed in the clearance between the farthest extending surface 20 of collar 16 and the shoulder 21 of the hard metal carbide facing 13.

The use of brazing filler metal for joining such metals as steel and hard metal carbides involves utilizing a metal which at room temperature is harder than the widely used so-called "tin solder" and which has a higher melting point than said tin solder. The brazing filler metals are illustrated by silver solder and copper solder. Brazing utilizing brazing filler metal involves heating the steel and hard metal carbide to at least a temperature which is about the same as the melting point of the brazing filler metal. A common brazing temperature for joining steel and hard metal carbide with a silver solder is about 800° C.

During production of the tool 10 in which the joints are heated and the brazing filler metal applied in the clearance between collar 16 and neck 19 to form joint 14, heating of the body of steel shank 11 is minimized by the cooling shoe 12. This results in preventing or minimizing possible softening of steel shank 11 as a consequence of the high temperature joining operation. The cooling effect resultant from the application of cooling shoe 12 also serves to prevent brazing filler metal from penetrating joint 17 between the lower face 22 of steel shank 11 and the upper face 23 of the neck 19 of the hard metal carbide facing 13. The cooling shoe 12 may be water cooled, e.g., by passage of water through channel 25 illustrated in outline by dotted lines. The brazed joint 14 is disposed as a ring between the neck 19 of the hard metal carbide facing 13 and the collar 16 of the steel shank 11 and is generally parallel to the direction of the applied force during the operation of the tool 10 resultant in only relatively slight fatigue potentialities therein.

Figure 2:
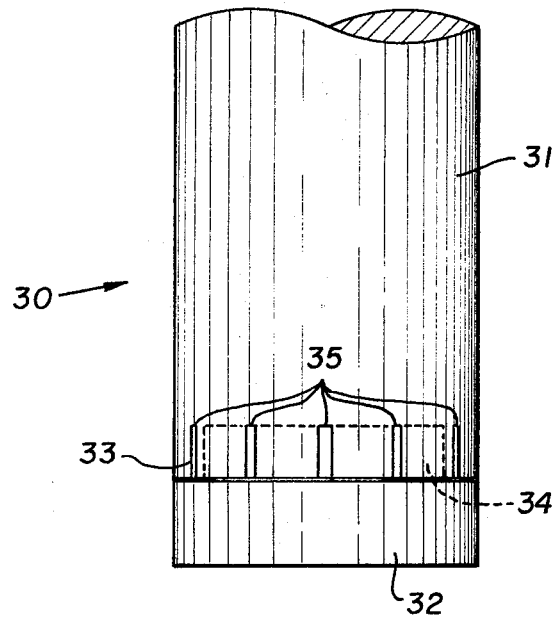
FIG. 2 is an elevation of a second embodiment of the invention.

FIG. 2 illustrates an embodiment of the invention particularly advantageous for large composite punches. The large composite punch 30 has a steel shank 31 and a hard metal carbide facing 32. The steel shank 31 has a downwardly extending collar 33 with circumferentially spaced slots 35 therealong. The hard metal carbide facing 32 has an upwardly extending neck 34 fitted into the collar 33.

The slots 35 function to reduce heat stress during cooling after the brazing operation. This is particularly advantageous when manufacturing large composite tools. It is also preferable that sufficient brazing filler metal be used during the brazing operation so that in addition to the clearance between the inner cylindrical surface of the collar 33 and the outer cylindrical surface of neck 34 being filled with brazing filler metal, filler metal also fills the slots 35.

The composite tools of the present invention preferably have a tool steel shank and a working surface of a sintered carbide such as tungsten carbide and/or titanium carbide and/or tantalum carbide.

As many embodiments of this invention may be made without departing from the spirit and scope thereof, it is to be understood that the invention includes all such modifications and variations as come within the scope of the appended claims.

What is claimed is:

1. A composite working tool having a working surface and an axial direction of metal working movement and of power transmission,
    said composite tool comprising a power transmitting body and a working body having said working surface, said working body being composed of hard metal carbide and being harder than said power transmitting body,
    said power transmitting body and said working body being in direct contact with each other along a plane substantially perpendicular to said axial direction whereby power is transmitted from one of said bodies to the other across said plane,
    one of said bodies having a narrowed portion and the other of said bodies having an opening defined therewithin to receive said narrowed portion,
    each of said narrowed portion and said opening having defining walls in the said axial direction,
    said defined opening being larger in size than said narrowed portion to receive the same therein with clearance between said defining walls, and
    brazing filler metal in said clearance and positioned between said defining walls to bond the same together in the said direction of power transmission of said tool.

2. The composite tool of claim 1 wherein said power transmitting body is a steel shank and wherein said body having said narrowed portion is male shaped and said other body is female shaped.

3. The composite tool of claim 2 wherein said working body has said narrowed portion.

4. The composition tool of claim 3 wherein the defining wall of said opening forms a collar which surrounds said male portion of said working body.

5. The composite tool of claim 4 wherein there is provided a second clearance between said bodies in the direction substantially normal to the direction of metal working movement and positioned at the end of said collar, and wherein brazing filler metal is in said second clearance.

6. The composite tool of claim 5 wherein said collar has a plurality of slots circumferentially spaced along said collar.

7. The composite tool of claim 6 wherein brazing filler metal is positioned in said slots.

8. A composite metal working tool having a desired direction of working movement and power transmission, said tool comprising a first body of steel, a second body of hard metal carbide, said two bodies having dissimilar heat expansion characteristics and hardness, said first body of steel and said second body of hard metal carbide being in direct contact with each other along a plane substantially perpendicular to said direction of working movement and power transmission, whereby power is transmitted from one of said bodies to the other across said plane when said composite tool is moved in said direction, one of said bodies having an elongated portion extending from the main portion of said body in the direction of the working movement of the tool, the other of said bodies having an elongated extension complementary to said first mentioned elongation and in the direction of working movement of said tool with a clearance defined between said complementary elongations said first mentioned elongation having a plurality of slots circumferentially spaced along the length of said elongation, and brazing filler metal in said slots and in said clearance bonding said complementary elongations together in the direction of movement of the tool.

9. The composite metal working tool of claim 8 wherein there is a second clearance between the end of said first mentioned elongation and said other body and wherein hard solder is positioned in said second clearance.

10. The composite metal working tool of claim 9 wherein said first mentioned elongation is a steel body shank, wherein said second mentioned elongation is a collar, and wherein said second body of hard metal carbide is a tool working surface.

11. A process for producing a composite tool having a working surface and an axial direction of metal working movement and of power transmission, said composite tool comprising a power transmitting body and a working body having said working surface, said working body being composed of hard metal carbide and being harder than said power transmitting body, said power transmitting body and said working body being in direct contact with each other along a plane substantially perpendicular to said axial direction whereby power is transmitted from one of said bodies to the other across said plane, one of said bodies having a narrowed portion and the other of said bodies having an opening defined therewithin to receive said narrowed portion, each of said narrowed portion and said opening having defining walls in the said axial direction, said defined opening being larger in size than said narrowed portion to receive the same therein with clearance between said defining walls, and brazing filler metal in said clearance and positioned between said defining walls to bond the same together in the said direction of power transmission of said tool comprising applying brazing filler metal in said clearance between the collar of the steel shank and said male portion of the hard metal carbide, and heating said brazing filler metal to substantially its melting point while cooling said steel shank.

12. The process of claim 11 wherein said steel shank is cooled by placing a cooling shoe in peripheral contact therewith.

* * * * *